United States Patent Office 3,495,165
Patented Feb. 10, 1970

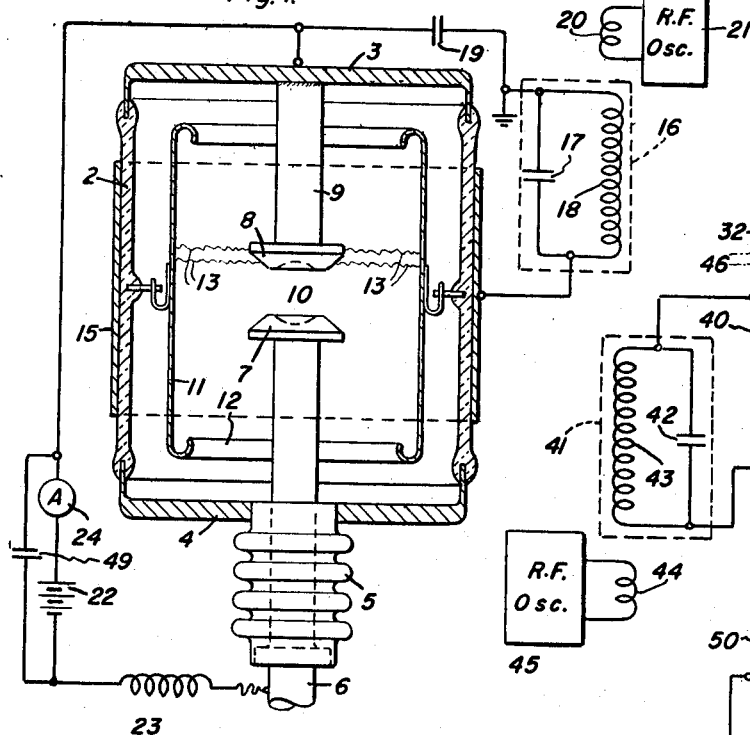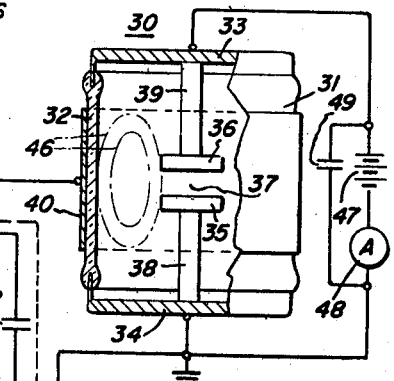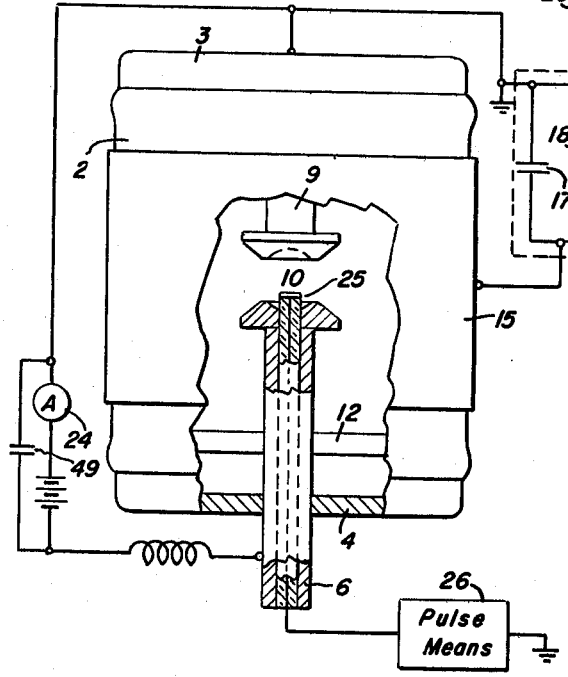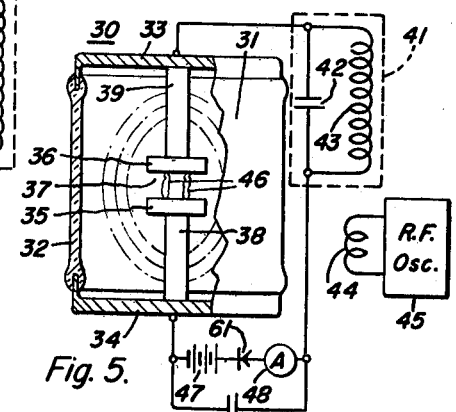
Inventors:
James D. Cobine;
James M. Lafferty,
by John F. Ahern
Their Attorney.

3,495,165
VACUUM DEVICE GAS MEASUREMENT
APPARATUS AND METHOD
James D. Cobine, Rexford, and James M. Lafferty, Schenectady, N.Y., assignors to General Electric Company, a corporation of New York
Filed Feb. 13, 1967, Ser. No. 615,437
Int. Cl. G01n 27/62
U.S. Cl. 324—33                10 Claims

ABSTRACT OF THE DISCLOSURE

A vacuum arc device such as a vacuum switch is tested for low pressure by coupling to one interior member through an insulating wall by means of a band or plate applied to the outer surface of the wall. A high frequency RF discharge is established within the device by connecting the coupling to a resonant circuit energized by an RF oscillator. Gaseous molecules within the vacuum chamber are ionized by the RF discharge and the ions thereof collected by a negatively biased electrode. The current caused by the collected ions is a measure of gaseous pressure within the vacuum device.

---

The present invention relates to vacuum arc devices such as vacuum switches and vacuum gaps and, more particularly, to apparatus and means for measuring the pressure within such devices without appending special pressure measurement devices thereto.

In the fabrication of high vacuum arc devices such as vacuum switches and vacuum gaps, every effort is expended in order to render the evacuable envelope absolutely impervious to the passage of gasses therethrough consistent with the maintenance of a very high degree of vacuum therein. Additionally, every precaution possible is taken in order to render the constituents of such devices which are exposed to the influence of an electric arc so free of gasses and gas-forming impurities that, even upon arcing, there is little or no release of gasses therein such as would cause the pressure within the device to increase above a reasonable operating pressure which is generally accepted to be a pressure of approximately $10^{-5}$ torr or less.

Despite all of the efforts expended in such fabrication, it is inevitable that, in production techniques, some devices will possess minute leaks which are not readily detectable instantaneously. Accordingly, it is common practice that such devices are fabricated and set aside for a period of time which may vary, but which is measured in days to allow for any minute leaks to cause the pressure therein to increase. It is desirable at this point to measure the device to determine whether the pressure therein has increased.

In another situation, when a component in use appears to be behaving erratically or is suspected of not having maintained its pressure, it is desirable that the component be removed from the circuit and tested to determine whether its vacuum is still within the reasonable operation range.

It is not reasonable to attach a separate pressure measuring device, such as an ionization gauge, to each vacuum device, because of the expense and the fragility of such gauges. Accordingly, some means must be utilized in order to measure pressure therein.

When an electrical lead is made through the vacuum envelope independent of the primary electrodes and such lead is, for example utilized to support a shield within the device to prevent deposition of vapors upon the insulating wall member thereof, the shield may be utilized as is done in Patent No. 3,263,162, issued July 26, 1966 to J. R. Lucek et al., to establish a magnetron discharge therein which allows for ionization and the collection of ions so formed as a measure of gas present.

In many instances, however, the shield support member utilized in the device does not pass through the insulating wall member, but is merely suspended or imbedded therein. Many vacuum arc devices, particularly vacuum gap devices not adapted to be utilized at very high currents, do not have any such shield member, thus making it difficut to apply the principles set forth in the aforementioned Lucek patent.

Accordingly it is an object of the present invention to provide apparatus and methods for measuring pressure within a vacuum arc device utilizing or having only the ordinary electrode connections thereto.

A further object of the present invention is to provide an improved, simple, and inexpensive means for measuring pressures within a vacuum arc discharge device without in any way effecting the internal configuration of the device.

Briefly stated, in accord with one embodiment of the invention, we provide means for attaching at least one coupling electrode temporarily about the exterior surface of an insulating wall of a vacuum discharge device and using the coupling electrode to cause the establishment of a high frequency radio frequency electric discharge within the device. We then utilize at least one of the permanent electrodes within said device as a probe and apply a negative potential thereto to collect ions generated by the radio frequency discharge therein. The current flow caused by the flow of ions through the collecting probe and an associated circuit is used to measure the pressure of gas within the device.

In one specific embodiment of the present invention we couple to a band about the insulator member of the device to be measured and utilize the band as one electrode for a radio frequency discharge and utilize one primary arc electrode of said device as the other electrode for the radio frequency discharge. The remaining primary arc electrode is negatively biased to collect ions which cause a current, the magnitude of which is a measure of gas pressure.

In yet another embodiment of the present invention, a pair of partially encircling electrodes are attached to the outer portion of the insulating cylinder of a vacuum arc device and a radio frequency discharge is established therebetween to cause the creation of positive ions therein. The primary arc electrodes of the device are then utilized as a measuring circuit for withdrawing positive ions from the discharge, the measure of which is an indication of pressure.

In yet another embodiment of the present invention the primary arc electrodes of the device are used both for the application of a radio frequency electric field and as a means for withdrawing a unidirectional current, due to ion collection, which is a measure of gaseous pressure within the device.

The novel features believed characteristic of the present invention are set forth in the appended claims. The invention itself, together with further objects and advantages thereof, may best be understood by reference to the following description taken in connection with the appended drawings in which:

FIGURE 1 is a representative circuit, including a vertical cross-sectional view of a vacuum switch and a circuit attached thereto for the measurement of pressure within the switch;

FIGURE 2 is a circuit similar to that illustrated in FIGURE 1 but utilizing a triggered vacuum gap device rather than a vacuum switch;

FIGURE 3 is a representative schematic circuit illustrating an alternative circuit and means for attaching electrodes to a vacuum gap having only two primary arc-electrodes therein in accord with the present invention;

FIGURE 4 illustrates in plan view, the means for attaching coupling electrodes in accord with another embodiment, and a circuit therefor; and FIGURE 5 illustrates yet another circuit arrangement for measuring gas pressures in a vacuum gap device in accord with the present invention.

In FIGURE 1, a vacuum switch represented generally as 1 includes an insulating cylindrical side wall member 2 and a pair of metallic end caps 3 and 4 appropirately sealed to the opposed ends of cylindrical side wall member 2. End wall member 4 is apertured at the center thereof and has a Sylphon bellows 5 suitably hermetically sealed thereto and also suitably hermetically sealed to electrode support member 6 which supports a first primary arc-electrode 7 within the volume of switch 1. A second primary arc-electrode 8 is mounted upon a second arc-electrode support member 9 which is suitably mechanically and electrically fastened in fixed relationship to the interior of end wall member 3. Arc-electrodes 7 and 8 define therebetween a vacuum gap 10 which may be closed by inward motion of arc-electrode support member 6 and a compression of Sylphon bellows 5 to establish contact between arc-electrodes 7 and 8. The arc-electrodes may be separated by a reciprocating motion of support member 6, withdrawing arc-electrode 7 from arc-electrode 8. If a voltage is applied across the electrodes during separation, an arc is stricken between the two and exists until a first current zero occurs, at which time the arc is extinguished. Within the envelope comprising cylindrical sidewall member 2 and end wall members 3 and 4, a shield member 11 of general cylindrical configuration having inwardly ferruled ends 12 serves to shield the interaction space of arcing region or gap 10 from the major portion of cylindrical side wall member 2, so that metal vapors and particles evaporated, sputtered, or otherwise removed from the arc electrodes are not deposited upon the insulating wall, causing a short-circuiting thereof. The shield is not electrically connected to either electrode and may be said to be electrically "floating."

In accord with the invention, shield means 11 is made one terminal of a radio frequency discharge, indicated schematically at 13 by capacitive coupling with an encircling band 15 which is temporarily affixed to the outer periphery of insulating side wall member 2 and connected with one side of a resonant circuit (contained within dashed square) 16 and comprising a capacitor 17 and an inductance 18. The other side of resonant circuit 16 is connected through a D.C. blocking condenser 19 to end wall member 3 and hence to arc-electrode 8. When resonant circuit 16 is energized by coupling with a coupling coil 20 connected to a radio frequency oscillator 21 for supplying radio frequency power, at sufficiently high voltage, arc-electrode 8 and shield member 11 become the terminals of a radio frequency discharge within the envelope of device 1. This causes the creation of a number of positive ions, the measurement of which is indicative of the gaseous pressure therein.

In further accord with our invention, we provide a suitable source of biasing potential, represented generally by battery 22, between are electrodes 7 and 8 and isolated from the radio frequency voltage by a choke coil 23 and a radio frequency by-pass condensor 49. With a negative potential applied to primary arc-electrode 7, ions generated by the radio frequency discharge within the envelope are attracted thereto, causing a direct current to flow through ammeter 24, the measurement of which is an indication of the pressure within the vacuum chamber. Actually this current may be as small as 100 micro-microammeters.

FIGURE 2 of the drawing illustrates a vertical view, with parts broken away, of a vacuum gap device and means for measuring the pressure therein in accord with the present invention. The gap device illustrated may be substantially that as disclosed and claimed in U.S. Patent No. 3,087,092, to J. M. Lafferty, and differs from the vacuum switch of the aforementioned embodiment in that both electrodes 7 and 8 are in fixed relationship, with the respective electrode support members 6 and 9 being permanently affixed to end plates 3 and 4 to define a fixed gap 10. In operation, an arc is established between the two primary arc electrodes (external circuit not shown) upon the release of an ionizable gas from a trigger electrode means 25 concentrically mounted within primary arc-electrode 7 and pulsed by suitable pulse means 26. In the operation of this apparatus, testing is done substantially as in FIGURE 1 with a radio frequency discharge established between shield means 11 and primary arc electrode 8 with primary arc electrode 7 used as a negatively biased probe to collect positive ions, including a D.C. current in the measuring circuit through ammeter 24, the magnitude of which is a measurement of pressure within device 1.

FIGURE 3 of the drawing illustrates an embodiment of the invention wherein the same inventive concept is utilized to measure pressure within a gap discharge device having no floating shield to serve as an induced electrode for a radio frequency discharge. Such device may, however, have a shield electrically attached to one arc-electrode. In FIGURE 3, gap discharge device 30 includes an evacuable envelope 31 including an insulating side wall member 32 and a pair of metallic end wall members 33 and 34 suitably connected in appropriate metal-to-ceramic or metal-to-glass seals to the ends of cylindrical side wall member 32. Within envelope 31, a pair of spaced arc-electrodes 35 and 36 define a fixed vacuum gap 37. Arc-electrodes 35 and 36 are mounted in fixed electrical and mechanical relationship to end wall members 33 and 34 by means of electrode support members 38 and 39, respectively.

In measuring the pressure within envelope 31 in accord with the present invention, a suitable conducing band 40 is temporarily fastened about cylindrical side wall member 32 and connected to one side of a grounded resonant circuit 41 comprising an inductance 43 and a capacitance 42. Inductance 43 is inductively coupled to the output coil 44 of a radio frequency oscillator 45 suitable to provide RF power. The application of a radio frequency voltage to band 40 causes an induced (alternating electric) field between arc-electrodes 35 and 36, and the wall 32, which causes radio frequency discharge 46 to be established thereat. This causes the ionization of gas molecules which may be therebetween. In further accord with the invention a measuring circuit, comprising a bias voltage source represented generally by a battery 47 and a suitable ammeter 48 shunted with an RF by-pass capacitor 49, is connected in series with the primary arc-electrodes applying negative bias to electrode 35. This causes ions generated within the region surrounding electrode 35 to be attracted to it and current to flow in the circuit from electrode 36 through biasing means 47, ammeter 48, and back through electrode 35. The current indicated at ammeter 48 is an indication of the gaseous pressure within envelope 31.

FIGURE 4 of the drawing illustrates another embodiment of the invention utilized to measure the pressure within an envelope of a gap discharge device essentially the same as that illustrated in FIGURE 3, but wherein a somewhat different technique is utilized. In FIGURE 4, envelope 31 has an insulating side wall member 32 and a pair of opposed gap electrodes 35 and 36 contained therein. A resonant circuit 41 comprising an inductance 43 and a capacitor 42 is coupled with coil 44 to a radio frequency oscillator 45. Opposite ends of resonant circuit 41 are connected to a pair of arcuate electrode members 50 and 51 which are fitted against oppositely disposed surface portions of insulating side wall member 32 and a radio frequency discharge represented by lines 52 is established within envelope 31. As in the embodiment of FIGURE 3, ionization of gas molecules within the gap causes the flow of an ion current to the electrodes, thus giving rise to a D.C. electric current in the measuring circuit, as indicated by ammeter 48, which is a measure of the pressure within envelope 31.

Another alternative embodiment of the invention is illustrated in FIGURE 5. In FIGURE 5, a two terminal vacuum gap device similar to that utilized in FIGURE 3, having no floating shield member therein, is tested for pressure in accord with the invention. As in FIGURE 2, device 30 has an envelope 31 including a cylindrical side wall member 32 and a pair of oppositely disposed end wall members 33 and 34. A pair of primary arc electrodes 35 and 36 are disposed in electrical and mechanical relationship with end wall members 33 and 34 to define a fixed gap 37, and are supported upon electrode support members 38 and 39 respectively. In accord with this embodiment of the invention the resonant circuit indicated within dashed lines 41 and comprising the capacitor 42 and an inductance 43 is connected in series circuit relationship through an RF by-pass capacitor 60 between arc electrodes 35 and 36. Resonant circuit 41 is activated by a primary coil 44 which is supplied with a suitably powered RF oscillator 45. In operation the RF voltage supplied to arc electrodes 35 and 36 causes a breakdown therebetween and between support members 38 and 39, represented generally by lines 46. The RF discharge causes the ionization of gaseous molecules surrounding the gap 37. A suitable biasing means represented generally by battery 47 in series with an appropriately poled rectifier 61, either solid state or electronic, is in series with a D.C. ammeter 48 and is in circuit with the arc-electrodes. Positive ions are drawn to the negatively-biased electrode 35, causing a current to flow through ammeter 48, thus giving an indication of gaseous pressure within envelope 31. The rectifier and battery 61 and 47, respectively, are utilized to supply a negative polarity to arc electrode 35. The combination of the two in circuit lowers the reference line of the alternating voltage placed upon the electrode below zero, so that at all times there is a negative ion-attracting polarity upon electrode 35. Alternatively, one may omit either of the battery or the rectifier. If the battery is omitted, a pulsed unidirectional voltage will appear on alternate half cycles and an intermittent ion current will flow which will be indicative of the gas pressure within envelope 31. If the rectifier is omitted and the battery is included, only a steady unidirectional voltage will be applied. In the preferred embodiment we use both, although one or the other could be omitted without seriously prejudicing the operation of the apparatus.

The operation of the aparatus of the present invention has been set forth for each of the proposed embodiments. In general, however, the radio frequency oscillator acts to cause the induction of a RF potential within the device which is sufficient to cause an alternating radio frequency discharge to occur even though no voltage is directly applied to the electrodes between which the discharge takes place. Such a discharge produces ions which contribute to a unidirectional current which, although of relatively low level, may be measured by an ammeter or electrometer and, with suitable calibration, may readily give a precise and repetitively accurate measure of the degree of vacuum within the device being tested. The apparatus and method of the present invention are qually suitable for use with vacuum switches or vacuum gaps so that whether the arc electrodes are fixed or variable in position it is not critical but if one of the electrodes is movable, they should be separated when the gas pressure measurement is made.

Generally the capacitance of the devices into which the radio frequency is supplied is for most devices of the order of from 50 to 100 micro-microfarads under which conditions it is appropriate to utilize a frequency of approximately 100 megacycles, although higher frequencies may be utilized. Two hundred watts of power at this frequency is sufficient. One may conveniently provide a frequency of 100 megacycles by utilizing as a resonant circuit in FIGURE 1 of the drawing a 100 micro-microfarad capacitor and 0.025 microhenry inductance. In FIGURE 1, inductance 23 may conveniently be approximately 10 microhenries to suitably protect the battery and microammeter from radio frequency energy and D.C. blocking capacitor 19 may suitably be 001. micro-farads to isolate the unidirectional voltage from the oscillator. The same values of inductance and capacitance may be utilized throughout the various circuit configurations as illustrated herein, although it should be understood that these figures are given for illustration purposes only, and it is clearly within the skill of one well versed in the art to choose appropriate values as is necessary in applying the invention to the testing of pressures in various devices.

What we claim as new and desire to secure by Letters Patent of the United States is:

1. Apparatus for testing the pressure of a vacuum arc device evacuated to a low pressure and including an evacuated sealed envelope having an insulating cylindrical side wall member as a portion thereof and containing at least a pair of separate arc-electrodes defining a gap therebetween within said envelope which apparatus comprises:
  (a) coupling means adapted to couple with said device and induce a radio frequency field within said sealed envelope when energized, said sealed envelope being stationary relative to said coupling means during operation;
  (b) means for supplying radio frequency oscillations to said coupling means,
    (b1) said radio frequency oscillations being operative to cause said coupling means to couple radio frequency energy into said envelope and establish therein a radio frequency discharge sufficient to ionize gaseous molecules contained therein
  (c) direct current bias means in circuit with one arc electrode within said envelope biasing said electrode to constantly attract gaseous ions created by said radio frequency discharge and,
  (d) measuring means in circuit with said arc electrode to measure the current resulting from the attraction of said ions and thereby give an indication of the gas pressure within said envelope.

2. The apparatus of claim 1 wherein said coupling means is a unitary structure surrounding said side wall member.

3. The apparatus of claim 2 wherein said coupling means is a band electrode clamped about the outer surface of said side wall member.

4. The apparatus of claim 1 wherein the coupling means comprises a plurality of members adapted to contact different surface portions of said side wall member.

5. The apparatus of claim 1 wherein said radio frequency field within said device is established between one of said arc-electrodes and an interaction space surrounding shield, and said direct current bias means is connected between said two arc-electrodes.

6. The apparatus of claim 2 wherein said coupling means are utilized to establish a radio frequency discharge between said arc electrodes and said direct current bias means is connected between said arc-electrodes.

7. The apparatus of claim 4 wherein said coupling means are utilized to establish a radio frequency discharge between said arc electrodes and said direct current bias means is connected between said arc-electrodes.

8. The apparatus of claim 1 wherein both said radio frequency oscillation means and said direct current biasing means are connected in circuit with said arc-electrodes.

9. The apparatus of claim 8 wherein said biasing means comprises a battery and a rectifier, said current measuring means is a meter serially connected to said biasing means, and further including a radio frequency by-pass capacitor shunting said serially connected biasing means and said current measuring means.

10. The method of measuring the pressure within a sealed electric arc discharge device originally evacuated to a high vacuum comprising the steps of:
   (a) coupling radio frequency energy into said device at a stationary location along the surface of said device to establish an ionizing radio frequency discharge within said device;
   (b) biasing one arc electrode of said sealed discharge device with a direct current bias to continuously attract ions created by said discharge and create a current flow, and
   (c) measuring said current flow to determine the gas pressure within said device.

References Cited

UNITED STATES PATENTS

| | | | |
|---|---|---|---|
| 2,544,078 | 3/1951 | Glassbrook | 324—33 |
| 2,602,914 | 7/1952 | Schlesman et al. | 324—33 |
| 2,696,566 | 12/1954 | Lion et al. | |
| 2,880,373 | 3/1951 | Soloway. | |
| 3,154,680 | 10/1964 | Greene. | |
| 3,223,873 | 12/1965 | Hampton | 324—33 X |

RUDOLPH V. ROLINEC, Primary Examiner

C. F. ROBERTS, Assistant Examiner

U.S. Cl. X.R.

324—24, 27